US012803436B2

(12) United States Patent
Klier et al.

(10) Patent No.: US 12,803,436 B2
(45) Date of Patent: Nov. 17, 2026

(54) CIRCUIT ARRANGEMENT WITH BRAKING RESISTOR AND METHOD FOR ACTIVATION

(71) Applicant: SEMIKRON DANFOSS ELEKTRONIK GMBH & CO. KG, Nuremberg (DE)

(72) Inventors: Johannes Klier, Amberg (DE); Peter Lemke, Schwabach (DE); Michael Uhl, Nuremberg (DE)

(73) Assignee: SEMIKRON DANFOSS ELEKTRONIK GMBH & CO. KG, Nuremberg (DE)

( * ) Notice: Subject to any disclaimer, the term of this patent is extended or adjusted under 35 U.S.C. 154(b) by 366 days.

(21) Appl. No.: 18/386,921

(22) Filed: Nov. 3, 2023

(65) Prior Publication Data

US 2024/0162816 A1 May 16, 2024

(30) Foreign Application Priority Data

Nov. 10, 2022 (DE) ..................... 10 2022 129 179.2

(51) Int. Cl.
*H02P 27/06* (2006.01)
*H02M 1/088* (2006.01)
(Continued)

(52) U.S. Cl.
CPC ........... *H02M 3/158* (2013.01); *H02M 1/088* (2013.01); *H02M 1/143* (2013.01)

(58) Field of Classification Search
CPC ...... H02M 3/158; H02M 1/088; H02M 1/143; H02M 3/1586; H02M 7/53871; H02M 1/32; H02P 3/22; H02P 27/04
See application file for complete search history.

(56) References Cited

U.S. PATENT DOCUMENTS

2013/0221888 A1* 8/2013 Horikoshi ............... H02P 27/06 318/400.29
2017/0355280 A1* 12/2017 Amler ................... B60L 15/007
2020/0017096 A1* 1/2020 Fukuda ................. B60W 20/00

FOREIGN PATENT DOCUMENTS

DE 102011075509 A1 11/2012
DE 102011087151 A1 5/2013
DE 112014005234 B4 8/2022

OTHER PUBLICATIONS

DE 10 2022 129 729.2, German Search Report dated Sep. 29, 2023, 6 pages—German; 6 pages—English.
(Continued)

*Primary Examiner* — Muhammad S Islam
(74) *Attorney, Agent, or Firm* — Andrew F. Young, Esq.; Nolte Lackenbach Siegel

(57) ABSTRACT

A circuit arrangement and a method with a DC voltage supply, a DC voltage intermediate circuit, a power converter, a control device for the power converter, and with a braking resistor. The power converter is formed as a multi-phase bridge circuit having at least one, preferably at least two first half bridge circuit(s) and having at least one, preferably at least two second half bridge circuit(s), which are each connected to the DC voltage intermediate circuit. A first resistor terminal of the braking resistor is connected to the middle tap of the first bridge circuit, and wherein a second resistor terminal of the braking resistor is connected to the middle tap of the second bridge circuit.

4 Claims, 3 Drawing Sheets

(51) Int. Cl.
*H02M 1/14* (2006.01)
*H02M 3/158* (2006.01)

(56) References Cited

OTHER PUBLICATIONS

Semikron Danfoss Elektronik GmbH & Co. KG, Response to Examination Report in German Patent Application No. 10 2022 129 729.2, dated Jan. 3, 2024. Certificate of Translation—1 page, English translation—3 pages, German (original doc)—3 pages.
Semikron Danfoss Elektronik GmbH & Co. KG, Amendment to Claims in German Patent Application No. 10 2022 129 729.2, dated Jan. 3, 2024. Certificate of Translation—1 page, English translation—3 pages, German (original doc)—3 pages.
German Patent and Trademark Office (DPMA), Deceision to Grant in German Patent Application No. 10 2022 129 729.2, dated Jan. 15, 2024. Certificate of Translation—1 page, English translation—2 pages, German (original doc)—6 pages.

* cited by examiner

CIRCUIT ARRANGEMENT WITH BRAKING RESISTOR AND METHOD FOR ACTIVATION

CROSS REFERENCE TO RELATED APPLICATIONS

This application relates to and claims priority to DE 10 2022 129 729.2 filed Nov. 10, 2023, the entire contents of which are incorporated herein fully by reference.

FIGURE SELECTED FOR PUBLICATION

FIG. 1.

BACKGROUND OF THE INVENTION

Field of the Invention

A circuit arrangement with a DC voltage supply, with a DC voltage intermediate circuit, with a power converter, with a control device of the power converter, and with a braking resistor. Further, the invention also describes a method for controlling such a circuit arrangement. Such circuit arrangements and methods are used, in particular, in partially or completely electrically operated vehicles. In the braking operation, the drive motor operating as a generator returns energy to the electrical system, from which the energy must be given off again in various ways. One option, which can also be provided together with other options, is to convert this energy into heat in a braking resistor.

Description of the Related Art

DE 10 2011 075 509 A1 discloses an energy storage system for a vehicle having an electric motor, the energy storage system including a braking resistor for discharging electrical energy provided by means of the electric motor during electric-motor braking, an electrical energy store for storing the electrical energy, and a direct-current controller which is connectable to an inverter of the electric motor, wherein a switching device is formed for selectively connecting the direct-current controller to the energy store or to the braking resistor.

Aspects and Objects of the Invention

At least one of the objects of the present invention is to provide an improvement over the related art.

The problem addressed by the invention is that of providing a method and a circuit arrangement having a power converter and a braking resistor, preferably having a plurality of at least two braking resistors, wherein the interruption of the energy supply of the braking resistor is redundantly possible.

This problem is solved according to the invention by a circuit arrangement with a DC voltage supply, with a DC voltage intermediate circuit, with a power converter, with a control device of the power converter, and with a braking resistor, wherein the power converter is formed as a multiphase bridge circuit having at least one, preferably at least two first half bridge circuit(s) and having at least one, preferably at least two second half bridge circuit(s), which are each connected to the DC voltage intermediate circuit, wherein a first resistor terminal of the braking resistor is connected to the middle tap of the first bridge circuit, and wherein a second resistor terminal of the braking resistor is connected to the middle tap of the second bridge circuit.

It can be advantageous when a first coil is arranged in the positive branch of the DC voltage intermediate circuit, a second coil is arranged in the negative branch of the DC voltage intermediate circuit, and both coils are preferably inductively coupled.

It can also be advantageous when a capacitor is arranged between the positive branch and the negative branch of the DC voltage intermediate circuit.

It is particularly preferred when, in the case of a plurality of braking resistors, every first resistor terminal is connected to the middle tap of an associated first half bridge circuit. In principle, multiple braking resistors in combination can form a braking resistor device and thus a structural unit.

It can also be preferred when, in the case of a plurality of braking resistors, at least two second resistor terminals are connected to a common middle tap of an associated second half bridge circuit.

In principle, each first or second bridge circuit can be in the form of a two-level circuit, a three-level circuit or as a multi-level circuit. Mixed forms within the power converter are also basically possible here.

It is also preferred, in principle, when the control device is designed and provided to switch a partial branch having at least two first half bridge circuits in a temporally staggered manner and preferably with a different duty cycle.

The problem is also solved by a method for controlling a power converter circuit according to one of the preceding claims and by at least two first half bridge circuits and at least one second half bridge circuit, each having a first and a second partial branch, wherein the middle tap of each first half bridge circuit is connected to a first resistor terminal of an associated braking resistor, wherein the second resistor terminal of a braking resistor is connected to the middle tap of a second half bridge circuit or in each case to the middle tap of a second half bridge circuit, and wherein the partial branches of the first half bridge circuits are switched in a temporally staggered manner and preferably with a different duty cycle, and wherein the complementary partial branch of the or an associated second half bridge circuit is closed in order to close a current path from the positive terminal to the negative terminal of the DC voltage supply.

In this method it can be advantageous when a first partial current path to an associated braking resistor arises by closing a first partial branch, the associated second partial current path from the braking resistor arises by closing a second partial branch, or a first partial current path to an associated braking resistor arises by closing a second partial branch, the associated second partial current path from the braking resistor arises by closing a first partial branch.

It can also be preferred when the partial branch of the second partial current path is permanently closed and is opened only in the event of a fault.

Of course, the features mentioned in the singular can be present multiple times in the arrangement according to the invention, provided this is not ruled out explicitly or per se or contradicts the idea of the invention.

It is understood that the various embodiments of the invention, regardless of whether they are mentioned in conjunction with the circuit arrangement or with the method, can be realized individually or in any combination in order to achieve improvements. In particular, the features mentioned above and to be described below can be used not only in the combinations described, but also in other combinations or alone, without leaving the scope of the present invention.

Further explanations of the invention, advantageous details and features, become clear from the following description of the exemplary embodiments of the invention, which are schematically shown in FIGS. 1 through 6, or of parts thereof.

According to one alternative and adaptive aspect of the invention three is provided a circuit arrangement and a method with a DC voltage supply, a DC voltage intermediate circuit, a power converter, a control device for the power converter, and with a braking resistor. The power converter is formed as a multi-phase bridge circuit having at least one, preferably at least two first half bridge circuit(s) and having at least one, preferably at least two second half bridge circuit(s), which are each connected to the DC voltage intermediate circuit. A first resistor terminal of the braking resistor is connected to the middle tap of the first bridge circuit, and wherein a second resistor terminal of the braking resistor is connected to the middle tap of the second bridge circuit.

According to another alternative aspect of the present invention, there is provided a circuit arrangement, comprising, a DC voltage supply, with a DC voltage intermediate circuit, a power converter, with a control device of the power converter, at least one braking resistor, wherein the power converter is formed as a multi-phase bridge circuit having at least one first half bridge circuit and having at least one second half bridge circuit, which are each connected to the DC voltage intermediate circuit, wherein at least one first resistor terminal of the at least one braking resistor is respectively connected to the middle tap of the at least one first bridge circuit, and wherein at least one second resistor terminal of the at least one braking resistor is respectively connected to the middle tap of the at least one second bridge circuit.

According to another alternative aspect of the present invention, there is provided a circuit arrangement, wherein, a first coil is arranged in a positive branch of the DC voltage intermediate circuit, a second coil is arranged in a negative branch of the DC voltage intermediate circuit, and each the first coil and the second coil is inductively coupled.

According to another alternative aspect of the present invention, there is provided a circuit arrangement, wherein, a capacitor is arranged between the positive and the negative branch of the DC voltage intermediate circuit.

According to another alternative aspect of the present invention, there is provided a circuit arrangement, further comprising, a plurality of the braking resistor, wherein every the at least one first resistor terminal is connected to the middle tap of an associated the first half bridge circuit.

According to another alternative aspect of the present invention, there is provided a circuit arrangement wherein, in the case of a plurality of braking resistors, at least two the second resistor terminals are connected to a common middle tap of an associated the second half bridge circuit.

According to another alternative aspect of the present invention, there is provided a circuit arrangement wherein, every respective the first or the second bridge circuit is formed as at least a two-level circuit.

According to another alternative aspect of the present invention, there is provided a circuit arrangement wherein, the control device is designed and provided to switch a partial branch having at least two the first half bridge circuits in a temporally staggered manner and with a different duty cycle.

According to another alternative aspect of the present invention, there is provided a method for controlling a power converter circuit, comprising the steps of, providing a power converter circuit, comprising, a DC voltage supply, with a DC voltage intermediate circuit, a power converter, with a control device of the power converter, at least one braking resistor, wherein the power converter is formed as a multi-phase bridge circuit having at least one first half bridge circuit and having at least one second half bridge circuit, which are each connected to the DC voltage intermediate circuit, wherein at least one first resistor terminal of the at least one braking resistor is respectively connected to the middle tap of the at least one first bridge circuit, and wherein at least one second resistor terminal of the at least one braking resistor is respectively connected to the middle tap of the at least one second bridge circuit, wherein the at least one second resistor terminal of the at least one braking resistor is connected to the middle tap of a second half bridge circuit or in each case to the middle tap of a second half bridge circuit, wherein the partial branches of the first half bridge circuits are switched in a temporally staggered manner and with a different duty cycle, and closing the complementary partial branch of an associated second half bridge circuit in order to close a current path from the positive terminal to the negative terminal of the DC voltage supply.

According to another alternative aspect of the present invention, there is provided a method wherein, a first partial current path to an associated braking resistor arises by closing a first partial branch, the associated second partial current path from the braking resistor arises by closing a second partial branch, or a first partial current path to an associated braking resistor arises by closing a second partial branch, the associated second partial current path from the braking resistor arises by closing a first partial branch.

According to another alternative aspect of the present invention, there is provided a method wherein, the partial branch of the second partial current path is permanently closed and is opened only in the event of a fault.

The above and other aspects, features, objects, and advantages of the present invention will become apparent from the following description read in conjunction with the accompanying drawings for exemplary but nonlimiting embodiments, in which like reference numerals designate the same elements.

DETAILED DESCRIPTION OF THE PREFERRED EMBODIMENTS

Figure 1:
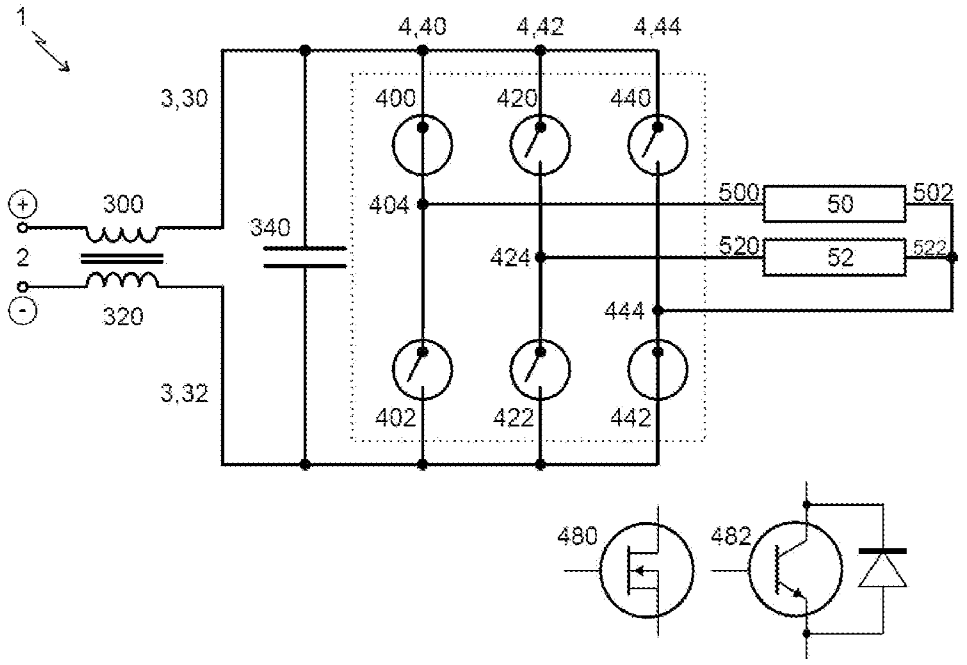
FIG. 1 shows a schematic view of a first embodiment of a circuit arrangement according to the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' or 'bond' or and similar terms do not necessarily denote direct and immediate connections, but also include connections through intermediate elements or devices. For purposes of convenience and clarity only, directional (up/ down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

FIG. 1 shows a schematic view of a first embodiment of a circuit arrangement 1 according to the invention. This circuit arrangement 1 has a DC voltage supply 2, which supplies a DC voltage intermediate circuit 3 having a positive branch 30 and the negative branch 32. A first coil 300 is connected to the positive pole of the DC voltage supply 2 and a second coil 320 is connected to the negative pole of the DC voltage supply 2. The two coils 300, 320 therefore each form an inductive element in the associated branch 30, 32, respectively, of the DC voltage intermediate circuit 3. Both coils 300, 320 are additionally inductively coupled in this case, which is routine.

Furthermore, a capacitor 340 is connected between the positive branch 30 and the negative branch 32 of the DC voltage intermediate circuit 3, as is also routine in a plurality of power converter circuit arrangements.

A power converter 4, which is in the form of a three-phase bridge circuit, is connected to this capacitor 340. This power converter 4 is advantageously formed as a power semiconductor module (shown by dashed lines) having a positive DC voltage load terminal and a negative DC voltage load terminal and three AC voltage load terminals. This three-phase bridge circuit has three half bridge circuits 40, 42, 44, which basically can be designed with any power semiconductor components. Preferably, although not limited hereto, the two-level half bridge circuit is formed having a first partial branch 400, 420, 440, which is the upper partial branch in this case, and a second partial branch 402, 422, 442, which is the lower partial branch in this case. Each partial branch is preferably formed from one or a plurality of MOS-FET(s) 480 connected in parallel, but is not limited hereto. One or multiple IGBTs 482 with power diodes connected in antiparallel are a further preferred embodiment of the power semiconductor component.

The circuit arrangement 1 also has two braking resistors 50, 52 which each have a first and a second resistor terminal 500, 520, 502, 522. In this embodiment, the two braking resistors 50, 52 form a structural unit having two first external resistor terminals and a second external collecting resistor terminal which is connected to the two second resistor terminals 520, 522 within the structural unit.

The half bridge circuits which are connected to a first resistor terminal 500, 520 are referred to as first half bridge circuits 40, 42, while the half bridge circuit which is connected to the collecting resistor terminal is referred to as a second half bridge circuit 44, while all these half bridge circuits in this embodiment are completely identical.

Specifically, the middle taps 404, 424 of the two first half bridge circuits 40, 42 are connected to an associated first resistor terminal 500, 520, respectively, while the middle tap 444 of the second half bridge circuit 44 is connected to the collecting resistor terminal and thus to the two second resistor terminals 502, 522.

Figure 2:
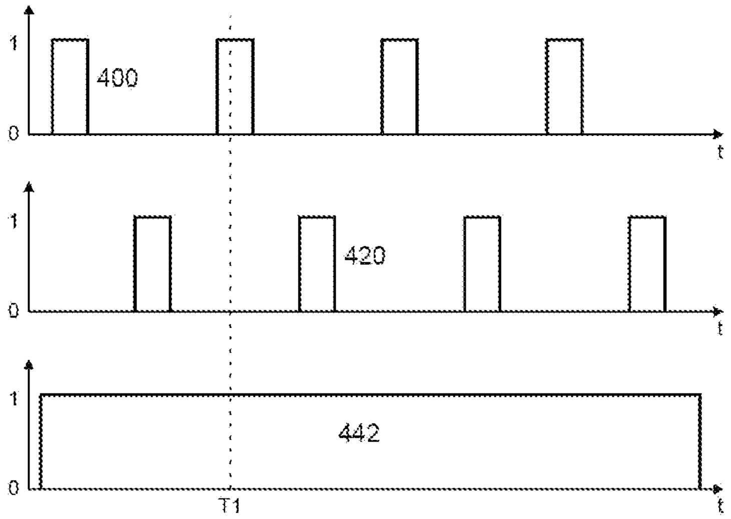
FIGS. 2 through 4 show various control options of the first circuit arrangement according to the invention in a time curve.
Figure 3:
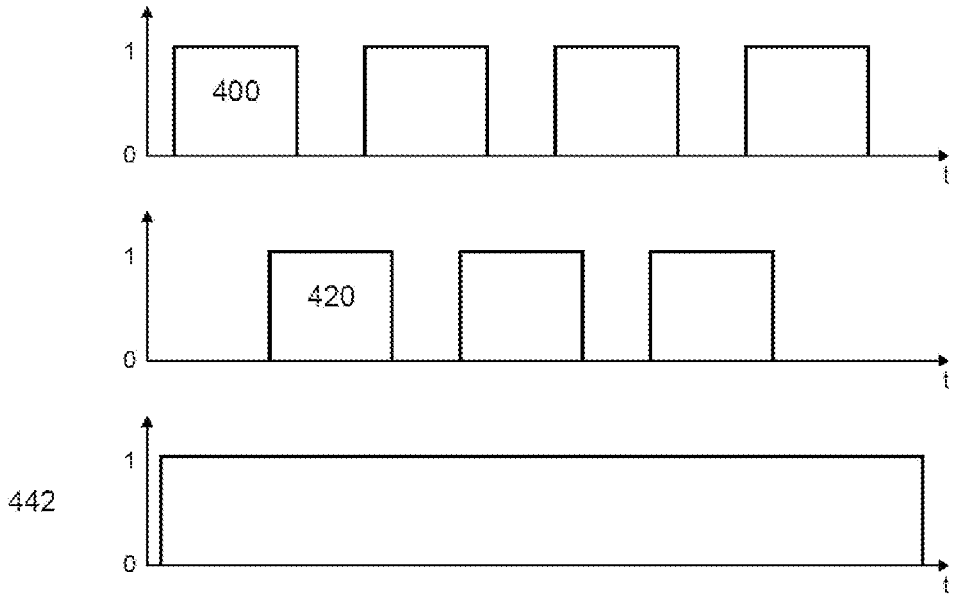
Figure 4:
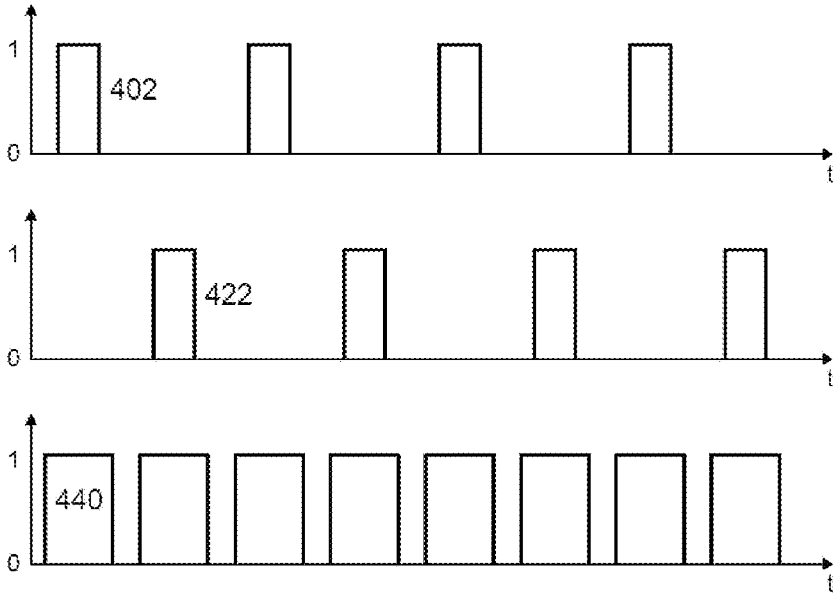

FIGS. 2 through 4 show various control options of the first circuit arrangement 1 according to the invention in a time curve, i.e., different variants of the method according to the invention, wherein all meaningful mixed forms of the variants shown are also basically possible, of course. The power converter 4, i.e., the three-phase bridge circuit, is not used in routine inverter operation in all variants, although it is controlled by a routine control device.

In the first variant of the method according to the invention, which is shown in FIG. 2, only the two first partial branches 400, 420 of the first half bridge circuits 40, 42 and the second partial branch 442 of the second half bridge circuit 44 are used. Therefore, only the time curve of the partial branches which are actively switched on and off is shown, while the remaining sub-circuits remain inactive and thus switched-off. Specifically, the two first half bridges 40, 42, more precisely their first partial branches 400, 420, are offset from each other by half a phase, i.e., 180°, and are both switched on with the same duty cycle. The activation period of each first partial branch 400, 420 is shorter than half a phase in this variant. The second half bridge 44, more precisely its second partial branch 442, is switched on during the entire operating period. Specifically, the second partial branch 442 is already switched on before one of the first partial branches 400, 420 is switched on for the first time. It is also switched off only once a first partial branch has been switched off for the last time. FIG. 1 shows the switching states at the point in time T1.

The described method according to the invention, as well as the further variants of the method according to the invention, in combination with the embodiment of the power converter circuit, have at least two essential advantages: On the one hand, each braking resistor is actively switched by means of two switches, a first partial branch and a second partial branch, and so there are also two options for passively switching the braking resistor in the event of a fault. On the other hand, due to the distributed, basically independent switching of two braking resistors, considerably fewer faults arise in the two branches of the DC voltage intermediate circuit and thus also less spurious radiation.

The variant shown in the second variant of the method according to the invention, which is shown in FIG. 3, differs from that according to FIG. 2 only to the extent that the activation period of each first partial branch 400, 420 in this variant is longer than half a phase. Preferably, the particular activation period in the time curve can also be changed.

In the third variant of the method according to the invention, which is shown in FIG. 4, only the two second partial branches 402, 422 of the first half bridge circuits 40, 42 and the first partial branch 440 of the second half bridge circuit 44 are used. Therefore, the two partial branches 402, 422 are offset from each other by half a phase, i.e., 180°, and are both switched on with the same duty cycle. The activation period of each second partial branch 402, 422 is shorter than half a phase in this variant. The second half bridge 44, more precisely its first partial branch 440, is switched on only while one of the two second partial branches 402, 422 of the first half bridge circuits 40, 42 is simultaneously switched on. The first partial branch 440 is preferably, but not necessarily, already switched on before one of the second partial branches 402, 422 is switched on. It is switched off only once the second partial branch 422 has been switched off.

Figure 5:
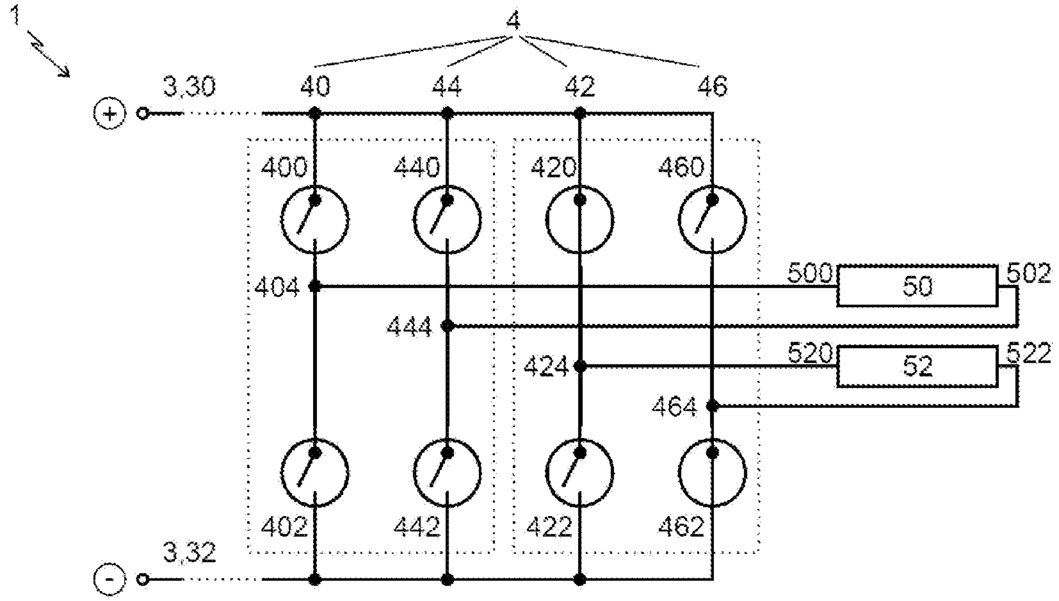
FIG. 5 shows a schematic view of a second embodiment of a circuit arrangement according to the invention.

FIG. 5 shows a schematic view of a second embodiment of a circuit arrangement 1 according to the invention. In contrast to the embodiment according to FIG. 1, the power converter 4 is formed as a four-phase bridge circuit which is preferably formed from two power semiconductor modules, which are each shown by dashed lines. One of the two braking resistors 50, 52 is associated with each of these power semiconductor modules.

Each power semiconductor module therefore has a first and a second half bridge circuit 40, 42, 44, 46. The middle tap 404 of the first half bridge circuit 40 of the first power semiconductor module is connected to the first resistor terminal 500 of the first braking resistor 50, while the middle tap 444 of the second half bridge circuit 44 of the first power semiconductor module is connected to the second resistor terminal 502 of the first braking resistor 50.

Furthermore, the middle tap 424 of the first half bridge circuit 42 of the second power semiconductor module is connected to the first resistor terminal 520 of the second braking resistor 52, while the middle tap 464 of the second half bridge circuit 46 of the second power semiconductor module is connected to the second resistor terminal 522 of the second braking resistor 52.

As a result, the power semiconductor module can also form a structural unit together with the associated braking resistors.

Figure 6:
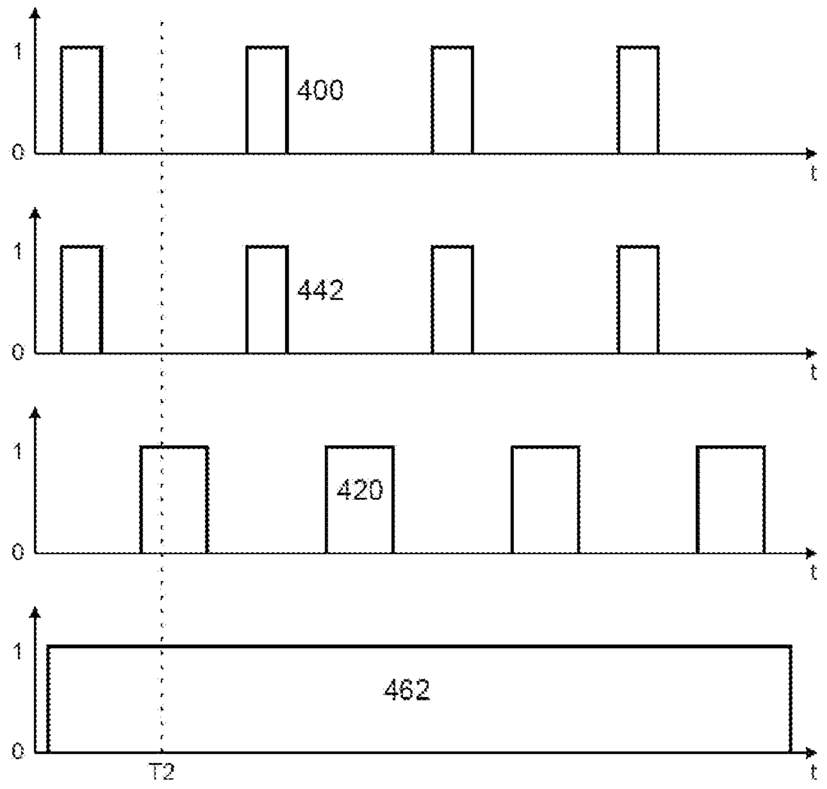
FIG. 6 shows a control option of the second circuit arrangement according to the invention in a time curve.

FIG. 6 shows a control option of the second circuit arrangement 1 according to the invention in a time curve, i.e., one further variant of the method according to the invention. Only the time curves of the switching states, the sub-circuits of which are switched on and off in this method, are shown. The remaining sub-circuits remain inactive and thus switched off.

The first sub-switch 400 of the first half bridge circuit 40 of the first power semiconductor module and the second sub-switch 442 of the second sub-circuit 44 of the first power semiconductor module are controlled simultaneously and with the same duty cycle.

The first sub-switch 420 of the first half bridge circuit 42 of the second power semiconductor module is actively switched in a temporally staggered manner, specifically, however, without limitation in this case, again by half a phase, with respect to the first sub-switch 400 of the first half bridge circuit 40 of the first power semiconductor module. The second sub-switch 462 of the second half bridge circuit 46 of the second power semiconductor module is permanently actively switched, cf. also FIG. 2. FIG. 5 shows the switching states at the point in time T2.

Due to this embodiment of the power converter arrangement 1 according to the invention, the redundancy with respect to fault prevention is further improved, since only one first and one second partial branch per power semiconductor module are necessary for operation. If one of these partial branches were to fail, the other partial branch can ensure that operation continues.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

What is claimed is:

1. A circuit arrangement (1), comprising:

a DC voltage supply (2), with a DC voltage intermediate circuit (3);

a power converter (4), with a control device of the power converter (4);

two braking resistors being a first breaking resistor and a second breaking resistor (50, 52);

wherein the power converter (4) is formed as a three-phase bridge circuit having two first half-bridge circuits (40, 42) and a second half-bridge circuit (44), each of which are connected to the DC voltage intermediate circuit (3);

wherein a first resistor terminal (500) of said first braking resistor (50) is respectively connected to the middle tap (404) of the first half-bridge circuit (40);

wherein a second resistor terminal (520) of said second braking resistor (52) is respectively connected to the middle tap (424) of the second half-bridge circuit (42);

wherein a second resistor terminal (502, 522) of one of said two braking resistors (50, 52) is respectively connected to the middle tap (444) of the second half-bridge circuit (44);

a first coil (300) is arranged in a positive branch (30) of the DC voltage intermediate circuit (3) and inductively coupled to the positive branch (30);

a second coil (320) is arranged in a negative branch (32) of the DC voltage intermediate circuit (3) and is inductively coupled to the negative branch (32);

a capacitor (340) between the positive branch (30) and the negative branch (32) of the DC voltage intermediate circuit (3) prior to a first of said two first half-bridge circuits (40); and each said first half-bridge circuit (40, 42) and said second half-bridge circuit (44) is at least a two-level circuit.

2. The circuit arrangement, according to claim 1, wherein:

the control device of the power converter (4) is designed and provided to respectively switch a partial branch (400, 402, 420) of said two first half-bridge circuits (40, 42) in a temporally staggered manner and with a different duty cycle.

3. A method for controlling a power converter circuit (1), comprising the steps of:

providing a power converter circuit (1), according to claim 1, comprising:

a DC voltage supply (2), with a DC voltage intermediate circuit (3);

a power converter (4), with a control device of the power converter (4);

two braking resistors being a first breaking resistor and a second breaking resistor (50, 52);

wherein the power converter (4) is formed as a three-phase bridge circuit having at least two first half-bridge circuits (40, 42) and a second half-bridge circuit (44), which are each connected to the DC voltage intermediate circuit (3);

wherein a first resistor terminal (500) of said first one braking resistor (50, 52) is respectively connected to the middle tap (404) of the first half-bridge circuit (40);

wherein a second resistor terminal (520) of said second braking resistor (52) is respectively connected to the middle tap (424) of the second half-bridge circuit (42);

wherein a second resistor terminal (502, 522) of one of said two braking resistors (50, 52) is respectively connected to the middle tap (444) of the second half-bridge circuit (44);

a first coil (300) is arranged in a positive branch (30) of the DC voltage intermediate circuit (3) and inductively coupled to the positive branch (30);

a second coil (320) is arranged in a negative branch (32) of the DC voltage intermediate circuit (3) and is inductively coupled to the negative branch (32);

a capacitor (340) between the positive branch (30) and the negative branch (32) of the DC voltage intermediate circuit (3) prior to a first of said two first half-bridge circuits (40); and each said first half-bridge circuit (40, 42) and said second half-bridge circuit (44) is at least a two-level circuit;

wherein the partial branches (400, 402, 420) of the two first half-bridge circuits (40, 42) are switched in a temporally staggered manner and with a different duty cycle; and closing the complementary partial branch of an associated second half bridge circuit (44, 46) that closes a current path from the positive terminal to the negative terminal of the DC voltage supply (2);

closing a first partial branch (400, 420) and forming a first partial current path to an associated one of said two braking resistors (50, 52); and forming a second partial current path from the braking resistor (50, 52) by closing a second partial branch (442) to an associated one of said two braking resistors (50, 52) by closing a second partial branch (402, 422), and the associated second partial current path from the braking resistor (50, 52) arises by closing a first partial branch (440, 460).

4. The method, according to claim 3, wherein:

the partial branch of the second partial current path is permanently closed and is opened only in the event of a fault.

* * * * *